US007801720B2

United States Patent
Satake et al.

(10) Patent No.: US 7,801,720 B2
(45) Date of Patent: Sep. 21, 2010

(54) TRANSLATION REQUESTING METHOD, TRANSLATION REQUESTING TERMINAL AND COMPUTER READABLE RECORDING MEDIUM

(75) Inventors: Masanori Satake, Ebina (JP); Hiroaki Ikegami, Ashigarakami-gun (JP); Hideaki Ashikaga, Ashigarakami-gun (JP); Shunichi Kimura, Ashigarakami-gun (JP); Hiroki Yoshimura, Ashigarakami-gun (JP); Masanori Onda, Ashigarakami-gun (JP); Masahiro Kato, Ashigarakami-gun (JP); Katsuhiko Itonori, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 663 days.

(21) Appl. No.: 11/213,971

(22) Filed: Aug. 30, 2005

(65) Prior Publication Data

US 2006/0200339 A1 Sep. 7, 2006

(30) Foreign Application Priority Data

Mar. 2, 2005 (JP) ............................. 2005-057458

(51) Int. Cl.
*G06F 17/28* (2006.01)
(52) U.S. Cl. ................. 704/4; 704/2; 704/5; 704/7
(58) Field of Classification Search ............... 704/1–10; 707/4, 100; 715/205, 209, 210, 234, 255, 715/256, 751
See application file for complete search history.

(56) References Cited

U.S. PATENT DOCUMENTS

| 4,814,988 | A | * | 3/1989 | Shiotani et al. ................. 704/5 |
| 5,126,728 | A | * | 6/1992 | Hall ............................ 726/30 |
| 5,331,554 | A | * | 7/1994 | Graham ......................... 707/5 |
| 5,960,080 | A | * | 9/1999 | Fahlman et al. .............. 380/252 |
| 6,442,607 | B1 | * | 8/2002 | Korn et al. ................... 709/225 |
| 6,678,822 | B1 | * | 1/2004 | Morar et al. ................. 713/182 |
| 7,039,700 | B2 | * | 5/2006 | Saeidi ......................... 709/224 |
| 7,103,915 | B2 | * | 9/2006 | Redlich et al. ................. 726/27 |
| 7,293,175 | B2 | * | 11/2007 | Brown et al. ................. 713/166 |
| 2002/0188435 | A1 | * | 12/2002 | Labarge ......................... 704/1 |
| 2003/0140106 | A1 | * | 7/2003 | Raguseo ...................... 709/207 |
| 2005/0004922 | A1 | * | 1/2005 | Zernik ........................ 707/100 |

FOREIGN PATENT DOCUMENTS

| JP | A 2003-016064 | 1/2003 |
| JP | A 2003-162353 | 6/2003 |
| JP | A-2003-323425 | 11/2003 |

* cited by examiner

*Primary Examiner*—Richemond Dorvil
*Assistant Examiner*—Jialong He
(74) *Attorney, Agent, or Firm*—Oliff & Berridge, PLC

(57) ABSTRACT

A translation requesting device has a first replacing unit, a translating unit and a second replacing unit. The first replacing unit replaces an original phrase to a substitute phrase. The translating unit translates the substitute phrase. The second replacing unit replaces the original phrase to a translation phrase based on the translated substitute phrase. The substitute phrase is decided to maintain semantic properties of the original phrase.

8 Claims, 4 Drawing Sheets

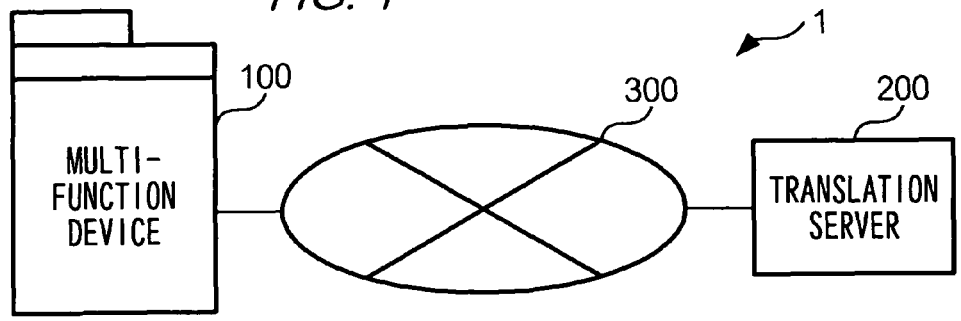
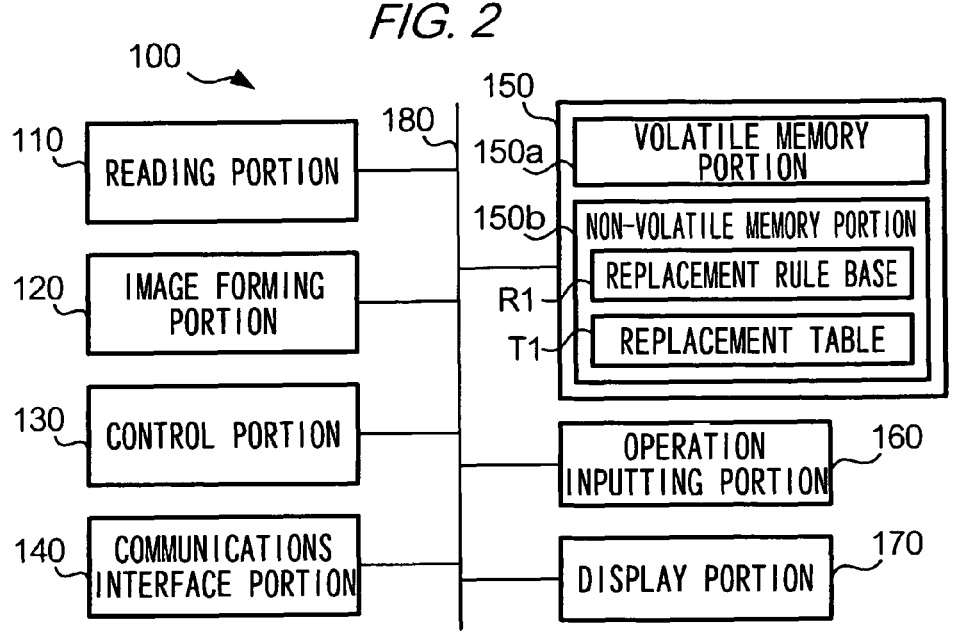
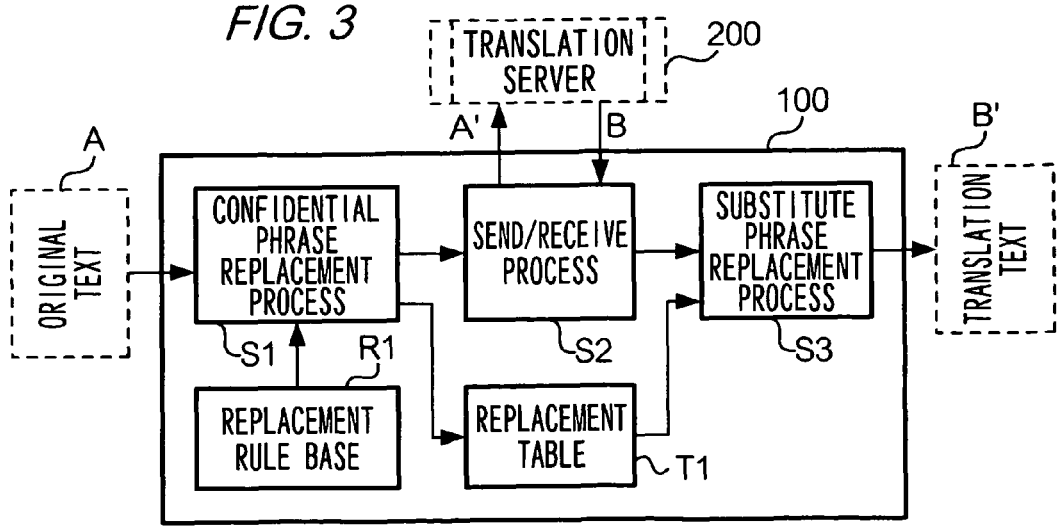

| CONFIDENTIAL PHRASES | SUBSTITUTE PHRASES | TRANSLATION PHRASES FOR SUBSTITUTE PHRASES | TRANSLATION PHRASES FOR CONFIDENTIAL PHRASES |
|---|---|---|---|
| *様,<br>*殿,<br>鈴木,<br>佐藤一郎 | 阿部さん、加藤さん、佐藤さん、田中さん、<br>⋮ | Mr. Abe,<br>Mr. Kato,<br>Mr. Sato,<br>Mr. Tanaka<br>⋮ | Mr. *,<br>Mr. *,<br>Suzuki,<br>Ichiro Sato |
| ㈱*<br>*株式会社 | ABC株式会社、<br>DEF株式会社、<br>GHI株式会社、<br>JKL株式会社 | ABC incorporated company,<br>DEF incorporated company,<br>GHI incorporated company<br>JKL incorporated company | *Corporation |
| *,*円,<br>*,*ドル | ランダムな値とランダムな単位を選択 | ¥ ###, ####<br>$ ###, #### | ¥*, *<br>$*, * |
| 製品*<br>プロジェクト* | ランダムな記号番号を選択 | product YYYY<br>project ZZZZ | product XXXX<br>project XXXX |

| CONFIDENTIAL PHRASES | SUBSTITUTE PHRASES | TRANSLATION PHRASES FOR SUBSTITUTE PHRASES | TRANSLATION PHRASES FOR CONFIDENTIAL PHRASES |
|---|---|---|---|
| ㈱ABC | DEF株式会社 | DEF Incorporated Company | ABC Corporation |
| 佐藤様 | 阿部さん | Mr. Abe | Mr. Sato |
| DEF株式会社 | GHI株式会社 | GHI Incorporated Company | DEF Corporation |
| 鈴木 | 加藤さん | Mr. Kato | Suzuki |
| 製品「abc123」 | 製品「O-No.1」 | Product "O-No.1" | Product "abc123" |
| $1,200 | 7,777円 | ¥7,777 | $1,200 |

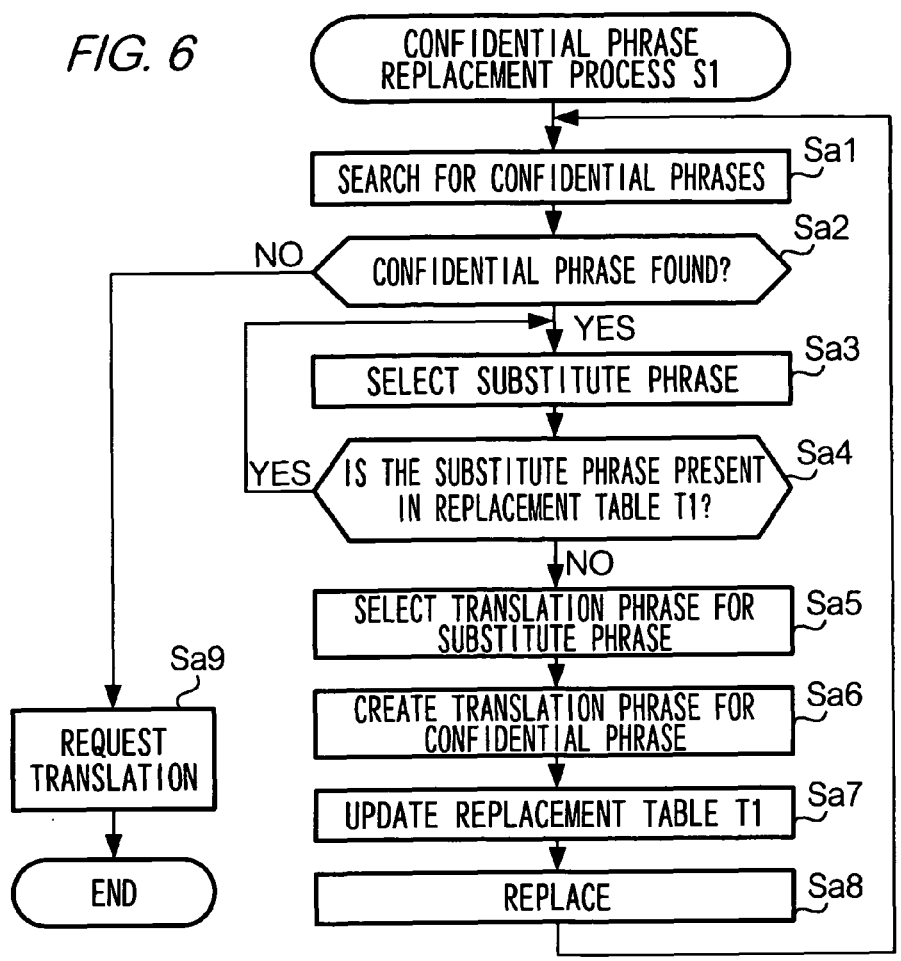

BEFORE REPLACEMENT
(TRANSLATION TEXT B)

AFTER REPLACEMENT
(TRANSLATION TEXT B')

TRANSLATION REQUESTING METHOD, TRANSLATION REQUESTING TERMINAL AND COMPUTER READABLE RECORDING MEDIUM

BACKGROUND OF THE INVENTION

1. Field of the Invention

The present invention relates to translation requesting methods and translation requesting terminals.

2. Description of the Related Art

The rapid increase in the global circulation of information brought about by international corporate activity and the spread of the Internet has created higher demand for machine translation, wherein one language (say, Japanese) is translated into another language (say, English), without human intervention. One example of a technology for enhancing the performance of machine translation is disclosed in Japanese Patent Application No. 2003-323425.

However, software offering advanced translation functionality is relatively expensive, which means that it is often difficult for the general user to purchase and use such high-performance software. It is therefore common to request a translation to an external translation server connected by a network.

When requesting a translation to an external translation server from a terminal, it is possible for an ill-intentioned third party on the network to see the content of the request, since the original text data is sent to the destination server over the network. While a method is generally used to send the original text data through a communication channel encrypted using SSL (Secure Socket Layer), TLS (Transport Layer Security), or other kinds of encryption in order to protect the confidentiality of the original text, it is nonetheless possible that even if the encrypted data arrives safely at the destination server, the translation server itself is a "posed" or otherwise fraudulent translation server. For this reason, it has been difficult to completely prevent all types of misuse of information requiring confidentiality ("confidential information") by third parties, if personal names, the names of products under development, or other kinds of confidential information are contained in the original text information.

The best option in order to fully protect the confidentiality of confidential phrases is not to allow the confidential phrases themselves to get out. A method is conceivable in which a person marks confidential phrases and deletes them. However, even if such a method is implemented, different personnel may have different ideas on which phrases are confidential, causing variations in the results of the method. Even if an effort were made to bring all the personnel into line regarding which phrases are confidential and double-checks were implemented, there nevertheless remains the possibility that a confidential phrase remains undetected and is thereby leaked in case of long original texts.

SUMMARY OF THE INVENTION

The present invention has been made in view of the above circumstances and provides a translation requesting method. The translation requesting method has replacing an original phrase to a substitute phrase, translating the substitute phrase, and replacing the original phrase to a translation phrase based on the translated substitute phrase. The substitute phrase is decided to maintain semantic properties of the original phrase.

With a translation requesting method according to an aspect of the present invention, it is possible to obtain high quality translation results, using an external translation service securely with the confidentiality of the original text maintained.

BRIEF DESCRIPTION OF THE DRAWINGS

Embodiments of the present invention will be described in detail based on the following figures, wherein:

FIG. 1 is a diagram showing a configuration of a translation system 1 according to an exemplary embodiment of the present invention;

FIG. 2 is a diagram showing a functional configuration of a multi-function device 100;

FIG. 3 is a conceptual diagram for describing an overview of processes executed by the multi-function device 100 according to an exemplary embodiment of the present invention;

FIG. 4 is a view showing an example of a replacement rule base R1;

FIG. 5 is a view showing an example of a replacement table T1;

FIG. 6 is a flowchart showing the flow of a confidential phrase replacement process S1;

FIGS. 7(a) and 7(b) are examples of an original text before and after the confidential phrase replacement process has been executed;

DETAILED DESCRIPTION OF THE INVENTION

Figure 8:
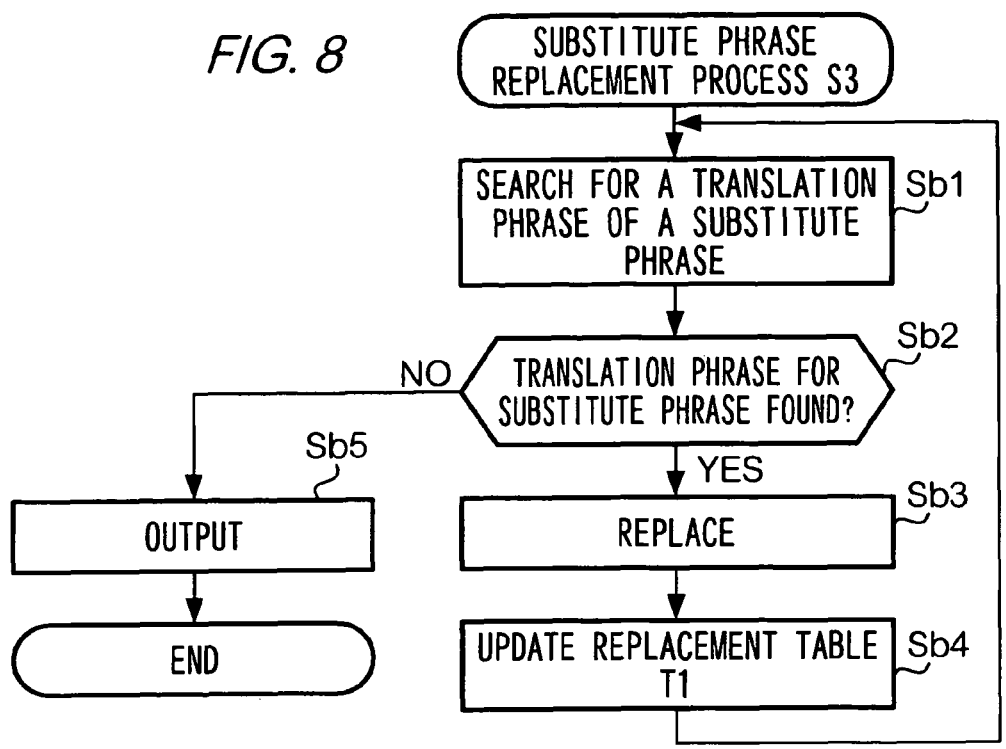
FIG. 8 is a flowchart showing the flow of a substitute phrase replacement process S3.

A description of an embodiment of the present invention will be explained, with reference to the drawings.

FIG. 1 is a diagram showing a configuration of a translation system 1 according to an embodiment of the present invention. A multi-function device 100 is a translation-requesting device, which is provided with the functions of copying, scanning, and printing, as well as a translation requesting function. The multi-function device 100 is connected to a translation server 200 via the Internet 300. The translation server 200 is a server device, which specifically performs translation processes and has a function for receiving original text data from the multi-function device 100 and generating a translation text from the received original text, and returning it. The multi-function device may be a client device. One instance of the multi-function device 100 and one instance of the translation server 200 are shown in FIG. 1, but the translation system 1 may have plural multi-function devices 100 and translation servers 200.

FIG. 2 is a diagram showing a functional configuration of the multi-function device 100. The multi-function device 100 is composed of a reading portion 110 for reading images formed on a document, an image forming portion 120 for forming the images on paper (recording medium), a communications interface portion 140 for communicating with external devices, a memory portion 150, an operation inputting portion 160, a display portion 170, and a control portion 130 which controls these various portions via a bus 180.

As shown in FIG. 2, the memory portion 150 has a volatile memory portion 150a and a non-volatile memory portion 150b. The volatile memory portion 150a is, for example, a RAM (Random Access Memory), and is used as a work area by the control portion 130 which operates in accordance with software. The non-volatile memory portion 150b is, for example, a hard disk, and contains a replacement rule base R1 and a replacement table T1 according to the present embodiment. The non-volatile memory portion 150b stores a translation-requesting program in which is defined a procedure for executing a translation requesting process according to the present embodiment.

The control portion 130 is, for example, a CPU (Central Processing Unit), and causes the multi-function device 100 to function as a scanner by outputting image data read by the reading portion 110 to an external device from the communications interface portion 140. The control portion 130 can cause the multi-function device 100 to function as a copier by outputting an image according to image data read by the reading portion 110 from the image forming portion 120. The control portion 130 further can cause the multi-function device 100 to function as a printer by outputting from the image forming portion 120 an image according to externally input data.

A translation requesting function is given as a function specific to the present embodiment, operated by the control portion 130. FIG. 3 is a conceptual diagram for describing an overview of processes related to translation requesting executed by the control portion 130.

A confidential phrase replacement process S1 is a process for replacing confidential phrases in an original text A with substitute phrases, by referencing the replacement rule base R1 (see FIG. 4; details follow later) stored in the non-volatile memory portion 150b. A send/receive process S2 is a process for sending an original text A', in which replacement of confidential phrases is complete, to the translation server 200 via the communications interface portion 140, and then receiving a translation text B, in which translation to a second language by the translation server 200 is complete, via the communications interface portion 140. A substitute phrase replacement process S3 is a process for replacing translated substitute phrases in the translation text B with the translation phrases of the confidential phrases, by referencing a replacement table T1 (see FIG. 5; details follow later) stored in the non-volatile memory portion 150b. The control portion 130 causes a translation text B', which was achieved through this substitute phrase replacement process S3, to be output to the image forming portion 120. These processes are executed by the control portion 130 of the multi-functional device reading a translation-requesting program stored in the non-volatile memory portion 150b.

FIG. 4 is a view showing an example of the replacement rule base R1 according to the present embodiment. As shown in the figure, the replacement rule base R1 is a collection of records made up of the fields "confidential phrases," "substitute phrases," "translation phrases for substitute phrases," and "translation phrases for confidential phrases." "Confidential phrases" are phrases whose confidentiality needs to be protected. One type of "confidential phrase" is phrases which contain minimal semantic units which include key phrases for specifying personal names, company names, monetary amounts, and so on (e.g., "Mr.," "Department," "Co., Ltd.," and "yen") (hereafter, "minimal semantic unit phrases"). Minimal semantic unit phrases including the key phrase "Mr." are, for example, addresses for personal names like "Mr. Suzuki," "Mr. Taro Tanaka," and so on, and are therefore confidential phrases. In order to make discovery of this type of confidential phrase possible, a key phrase such as "Mr." is defined in the "confidential phrase" field. "Confidential phrases" also cover phrases which do not contain a key phrase. For example, "2005/01/01" expressing a date and other minimal semantic unit phrases for which there exist specific rules for the ordering of numbers are also "confidential phrases." In order to make discovery of this type of confidential phrase possible, a rule for the ordering of numbers is defined in the "confidential phrases" field. Further, personal names and geographic names, for instance, without prefixes or suffixes are also confidential phrases. In order to be able to specify this type of phrase as a confidential phrase, dictionaries of personal names, geographic names, and so on are included in the "confidential phrase" field.

The "substitute phrases" field specifies phrases to replace confidential phrases (hereafter, "substitute phrases"). The control portion 130 selects a substitute phrase according to the content stored in the "substitute phrases" field when it discovers a confidential phrase in the original text which is to be translated. As shown in the figure, a number of candidates for the substitute phrase are stored for confidential phrases which have similar semantic properties. The confidential phrases are replaced with a randomly selected substitute phrase from among the various candidates. If the confidential phrase includes a key phrase or otherwise has a specific format, the part of the confidential phrase minus that format is replaced by a randomly selected substitute phrase from among the various candidates. For instance, if the confidential phrase is a date, a different, random date is selected as the substitute phrase, while maintaining the date format. If the confidential phrase is a monetary amount, only the numerical portion is replaced by different, random numbers and is selected as the substitute phrase, while maintaining the "dollar," "yen," or other currency denomination. If the confidential phrase is a geographic name, various geographic names are stored as substitute phrases for state and city names, and one of those various candidates is selected as the substitute phrase. If the substitute phrase is a personal name and the sex can be determined, a personal name ordinarily used for that sex is selected from among various candidates. Substitute phrases are thus selected such that the semantic properties of the confidential phrases are maintained.

Translation phrases corresponding to each substitute phrase stored as a replacement candidate in the "substitute phrases" field are stored in the "translation phrases for substitution phrases" field. Further, rules for creating translation phrases for confidential phrases stored in the "confidential phrases" field are stored in a "translation phrases for confidential phrases" field. The control portion 130 executes, in order, (1) a specification process for confidential phrases in the original text, (2) a selection process for substitute phrases, (3) a selection process for translation phrases of substitute phrases, and (4) a creation process for translation phrases of confidential phrases, according to the replacement rule base R1. The content stored in the replacement rule base R1 shown in the figure is only an example and is not limited to this. The stored content may be set ahead of time when the multi-function device 100 is shipped from the factory, or it may also be configured such that a user of the multi-function device 100 can make additions and deletions by operating the operation inputting portion 160.

FIG. 5 is a diagram showing an example of the replacement table T1 according to the present embodiment. Like the replacement rule base R1, the replacement table T1 is a collection of records made up of the fields "confidential phrases", "substitute phrases," "translation phrases for substitute phrases," and "translation phrases for confidential phrases." As described above, the control portion 130 randomly selects one substitute phrase from among the various candidates stored in the "substitute phrases" field in the replacement rule base R1 during the substitute phrase selection process executed according to the replacement rule base R1, but it does not immediately output the selected substitute phrase as a selection result, instead first referencing the replacement table T1 and determining whether or not the selected substitute phrase is present among the records stored in the replacement table T1. If, as a result of referencing the replacement table T1, it is determined that the selected substitute phrase is present among the records in the replacement table T1, then the control portion 130 again references the "substitute phrases" field in the replacement base R1 and randomly selects one substitute phrase from among the remaining substitute phrases after eliminating the previously selected substitute phrase from the substitute phrase candidates. The control portion 130 determines whether or not the newly selected substitute phrase is present among the records in the replacement table T1 and if the result is affirmative, then it randomly selects one substitute phrase from among the remaining substitute phrases after eliminating the substitute phrase selected the first time and the substitute phrase selected the second time from the substitute phrase candidates. Only once the control portion 130 confirms that the selected substitute phrase is not present in the replacement table T1 does it set the selected substitute phrase as the final output result, and then moves on to the process of selecting a translation phrase for the substitute phrase, which is the next process.

Since substitute phrases already stored in the replacement table T1 are eliminated from the group of substitute phrases which can be selected, candidates which can be selected as substitute phrases run out as a result of the fact that the records generated in the translation requesting process for a very large document accumulate in the replacement table T1. In this case, the control portion 130 generates a processing error notification indicating that this has happened, displays this error notification in the display portion 170, alerts the user via an alarm, and interrupts execution of the translation requesting process. When the user receives the error notification, the user can add new candidates for substitute phrases using the operation inputting portion 160 and input an instruction for the control portion 130 to restart the translation requesting process. In order to reduce the frequency with which such processing errors occur, a large number of substitute phrase candidates, for example 1000 substitute phrase candidates, are stored in the replacement rule base R1. When execution of the substitute phrase replacement process S3 for replacing the translation phrases of the substitute phrases in the translation text with translation phrases of the confidential phrases is complete, the control portion 130 is designed to delete all records which include substitute phrases for which replacement from the replacement table T1 is complete.

Returning once again to FIG. 5, the content stored in replacement table T1 is updated when any phrase in the "confidential phrases," "substitute phrases," "translation phrases for substitution phrases," or "translation phrases for confidential phrases" fields is specified based on the results of the processes (1) to (4) above. In other words, the control portion 130 stores the confidential phrase obtained as a result of the specification process for confidential phrases in the "confidential phrases" field in the replacement table T1, the substitute phrase obtained as a result of the selection process for substitute phrases in the "substitute phrases" field in the replacement table T1, the translation phrase obtained as a result of the selection process of translation phrases for substitute phrases in the "translation phrases for substitute phrases" field in the replacement table T1, and the translation phrase obtained as a result of the creation process of translation phrases for confidential phrases in the "translation phrases for confidential phrases" field in the replacement table T1. After receiving the translation text from the translation server 200, the control portion 130 performs the substitute phrase replacement process S3 for replacing substitute phrases which have been translated with translation phrases for confidential phrases based on the content stored in the replacement table T1.

Next, an operation of the translation system 1 is described. The following operation examples are described, separated into the following two operations: 1) everything from the user reading a document, on which a Japanese original text is recorded and printed on paper, into the multi-function device 100, the multi-function device 100 performing the confidential phrase replacement process S1 on the original text, and up to sending the original text, which has undergone replacement, to the translation server 200 and performing the request for translation service; and 2) everything from the multi-function device 100 receiving the English translation text from the translation server 200 and up to printing it out on paper (a recording medium) after performing the substitute phrase replacement process S3.

(1) Operation up to Requesting Translation Service

First, the user sets a document on which is printed the Japanese of the original text in an ADF (Automatic Document Feeder) (not shown) on the reading portion 110 of the multi-function device 100. The user operates the operation inputting portion 160 so that a menu screen is displayed. The user selects "translate" from the menu. Selecting "translate" causes a screen to be displayed in the displaying portion 170 for making detailed settings for translation. The user selects whether or not to perform the confidential phrase replacement process by operating the operation inputting portion 160, designates the language of the original text and the translation text, and so on. It is also possible in this screen to specify the destination translation server 200 from among various candidates. In the present embodiment, it is assumed that the user selects the "confidential phrase replacement process" and designates the language of the original text as "Japanese" and the language of the translation text as "English."

When the user presses the "Start" button in the operation inputting portion 160, the control portion 130 transports the document set in the ADF on the reading portion 110 up to the reading position one page at a time and outputs an instruction to scan. As a result, the document is read one page at a time by the reading portion 110 and image data expressing images read from the document is generated.

Next, the control portion 130 performs an optical character recognition process on the image data and stores the character string data which is the result of the optical character recognition process in the volatile memory portion 150a.

Next, the control portion 130 references the replacement rule base R1 and performs the confidential phrase replacement process S1 (FIG. 6) on the character string data stored in the volatile memory portion 150a. FIG. 7(a) is an example of a text for translation (original text A), which is the character string data before the confidential phrase replacement process S1 is performed.

The confidential phrase replacement process S1 is performed on the original text A as follows. First, the control portion 130 searches for confidential phrases in the character string data (FIG. 6, Step Sa1) in accordance with the definitions in the "confidential phrases" field in the replacement rule base R1 (FIG. 4). If no "confidential phrases" are detected (Step Sa2: No), the control portion 130 proceeds to Step Sa9 and sends the character string data of the original text A to the translation server 200. If, however, the original text A contains, for example, a confidential phrase such as "(株)ABC," shown in the top left of FIG. 7(a), which includes the key phrase "(株)" and this confidential phrase is defined as a confidential phrase in the replacement rule base R1, then the result of Step Sa2 is Yes. In this case, the control portion 130 stores the confidential phrase in the volatile memory portion 150a and then selects a substitute phrase from among the various candidates in the "substitute phrase" field in the same record in the replacement rule base R1 (Step Sa3).

Next, the control portion 130 determines whether or not the selected substitute phrase is present in the replacement table T1, and if the result is affirmative (Step Sa4: Yes), then it returns to Step Sa3 and selects a different substitute phrase. If, on the other hand, the selected substitute phrase is not present in the replacement table T1 (Step Sa4: No), then the control portion 130 sets the substitute phrase selected in the process in Step Sa3 as the output result and stores it temporarily in the volatile memory portion 150a. In the present embodiment, it is assumed that "DEF 株式会社" is selected as the substitute phrase as a result of the processes in Step Sa3 and Step Sa4.

Next, the control portion 130 selects "DEF Incorporated Company" as the translation phrase for the selected substitute phrase according to the replacement rule base R1 (Step Sa5) and creates "ABC Corporation" as the translation phrase for the confidential phrase (Step Sa6), storing both output results temporarily in the volatile memory portion 150a. The control portion 130 associates the "confidential phrase," the "substitute phrase," the "translation phrase for the substitute phrase," and the "translation phrase for the confidential phrase," which are stored temporarily in the volatile memory portion 150a, and adds them to the replacement table T1 as a new record (Step Sa7). In other words, it writes "(株) ABC," "DEF株式会社," "DEF Incorporated Company," and "ABC Corporation" in the fields of the new record in the replacement table T1.

Next, the control portion 130 replaces the confidential phrases in the original text A with the substitute phrases in the new record, in accordance with that new record stored in the replacement table T1. Specifically, it replaces "(株) ABC" with "DEF 株式会社" (Step Sa8).

When the replacement process in Step Sa8 is complete, the routine returns again to Step Sa1 and the control portion 130 searches for confidential phrases in the character string data to be translated. Every time a confidential phrase is discovered (Step Sa2: Yes), the control portion 130 performs the processes from Step Sa3 through Sa8. When the replacement process for all the confidential phrases is complete (Step Sa2: No), the multi-function device 100 sends an original text A', which has undergone the replacement process, to the translation server 200 (Step Sa9). FIG. 7(b) is a diagram showing an example of the original text A' after the confidential phrase replacement process has been performed for all confidential phrases. The replacement table T1 in FIG. 5 shows the content stored after a replacement table update process in Step Sa7 has been performed for all the confidential phrases contained in the original text A (FIG. 7(a)).

When sending the original text A' (FIG. 7(b)) to the translation server 200, the multi-function device 100 sends the character string data showing the original text A', an ID number specifying identity, and other information. The translation server 200 which received the character string data performs the process of translating the received character string data into the specified language (English) and generates character string data for the translation text. The translation server 200 sends the generated character string data to the multi-function device 100 specified by the ID number attached to the data at the time the translation was requested.

(2) Operation from Receiving Translation Text from Translation server 200

When the multi-function device 100 receives the character string data of the translation text from the translation server 200, it first stores this character string data in the volatile memory portion 150a. After that, the control portion 130 on the multi-function device 100 reads the character string data from the volatile memory portion 150a and executes the substitute phrase replacement process S3 shown in FIG. 8. In the present embodiment, a case is described in which the substitute phrase replacement process is performed after the character string data of a translation text B shown in FIG. 9(a) is received and stored in the volatile memory portion 150a.

Figure 9A:
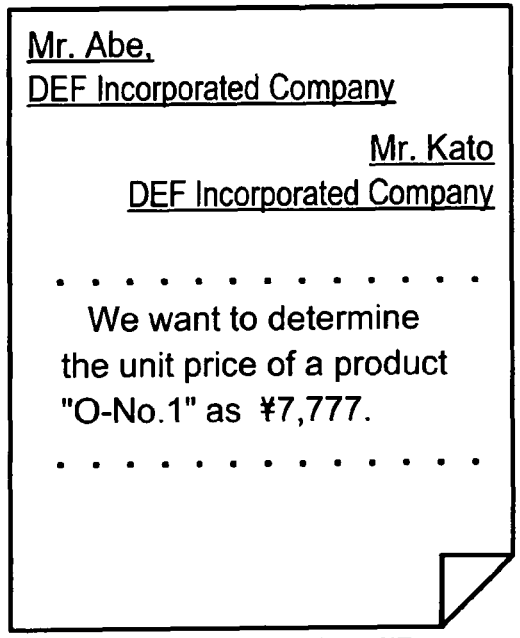
FIGS. 9(a) and 9(b) are examples of a translated text before and after the substitute phrase replacement process have been executed.

First, the control portion 130 searches the character string data for "translation phrases for substitute phrases" stored in the replacement table T1 (FIG. 8, Step Sb1). If no "translation phrase for substitute phrase" is detected (Step Sb2: No), the control portion 130 terminates the replacement process, and stores the character string data of the translation text B temporarily in the volatile memory portion 150a before outputting it. The character string data of the translation text output from the control portion 130 is formed as an image on paper (recording medium) by the image forming portion 120 and then output (Step Sb5).

Figure 9B:
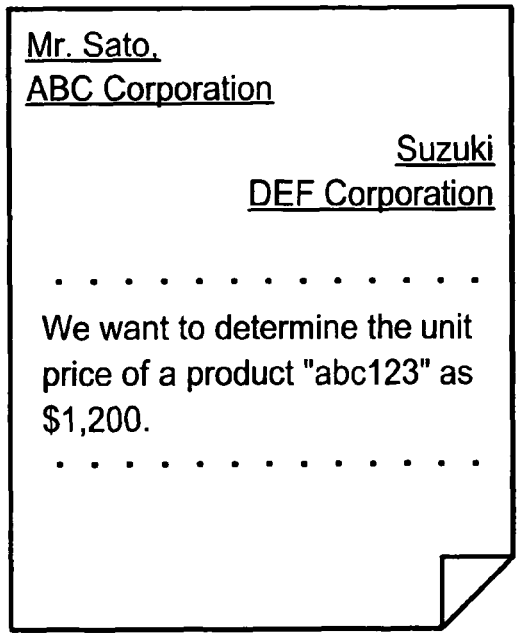

However, the operation is as follows if at least one of the "translation phrases for substitute phrases" stored in the replacement table T1 is found in the character string data. As shown in the example in FIG. 9(a), the translation text contains the phrase "DEF Incorporated Company," and this is stored in the replacement table T1 as a "translation phrase for a substitute phrase." The control portion 130 therefore detects this "DEF Incorporated Company" as a "translation phrase for a substitute phrase" (Step Sb2: Yes). Next, the control portion 130 replaces the translation phrase for the detected substitute phrase with the translation phrase for the confidential phrase stored in association with the translation phrase of the substitute phrase in replacement table T1 (Step Sb3). In other words, the control portion 130 replaces "DEF Incorporated Company" with "ABC Corporation." Next, the control portion 130 deletes records containing translation phrases for substitute phrases, replacement of which is complete, from the replacement table T1 (Step Sb4). Every time a "translation phrase for a substitute phrase" is discovered (Step Sb2: Yes), the processes from Step Sb3 through Sb4 are performed. When the processes of Steps Sb3 and Sb4 are finished for all the "translation phrases for substitute phrases" (Step Sb2: No), the control portion 130 terminates the replacement process, and stores the character string data of a translation text B' in the volatile memory portion 150a before outputting it. The character string data of the translation text output from the control portion 130 is formed as an image on paper (recording medium) by the image forming portion 120 and then output (Step Sb5). When this happens, the translation text B' shown in FIG. 9(b) is printed and output by the multi-function device 100.

In this manner, the user simply sets a document which contains a text in the multi-function device 100, presses a button to indicate a translation with confidential phrase replacement process, and can thereby receive an external translation service with confidentiality protected. All the user has to do is to wait for the translation result to be printed out from the multi-function device 100. In order to input the original text into a translation device, the user does not need to type the Japanese text by keyboard or save the character string data of the original text to a CD-ROM or other recordable media and carry it around; as long as the user has the paper (document) on which the original text is printed, he or she can obtain a translation.

If the multi-function device 100 according to the present embodiment is installed in, for example, a convenience store, users can obtain translations of documents securely and easily. For example, if a user wants to translate into English a letter written in Japanese to a friend in an English-speaking country, he or she can obtain a translation result securely just like making a copy, without having his or her personal information or that of the friend disclosed to the translation service, which is a third party.

With the multi-function device 100 according to the present embodiment, phrases in an original text to be translated that are confidential are automatically replaced with substitute phrases before being sent to an external translation server, making it possible to completely prevent leaking of confidential information in the original text. In cases where the trustworthiness of a translation service is unknown because it is being used for the first time or for other reasons, an original text is delivered to the destination where the translation is requested with all confidential information replaced by substitute phrases, making it possible to request a translation with peace of mind and to minimize any damage in the event that the information is misused. With the multi-function device 100 according to the present embodiment, the substitute phrase that replaces a certain confidential phrase is randomly changed and not always the same, further reducing the risk of leakage of confidential information.

Further, since neither the multi-function device 100, from which the translation request originates, nor the translation server 200, where the request is sent, require encryption when sending the character string data of either the original text or the translation text, the processing load related to encryption is reduced, thereby significantly improving the processing efficiency of the overall translation system compared to conventional systems. This makes it possible to minimize a drop in performance even when translating large documents. Furthermore, as long as the multi-function device 100 according to the present embodiment is used to request translations, a conventional type of the translation server 200 need only create a translation text using a conventional method and send that translation text to the multi-function device 100 in order to protect confidential information in the original text, obviating the need for any particular functional configuration of the translation server 200 in order to protect the confidentiality of documents. Also, the problem of not being able to request a translation service because the multi-function device 100, which is the terminal where the request originates, is not compatible with encryption processes does not arise.

Situations can also be avoided where a nonsensical translation text is created because confidential phrases were kept confidential since confidential phrases in the original text are replaced with substitute phrases with the semantic properties of the confidential phrases maintained.

Variations:

Although a description of an embodiment of the present invention was given above, the present invention may be embodied in many other ways, not limited to the above-mentioned embodiment.

In the above embodiments, aspects were described in which the multi-function device 100 was used as a translation requesting terminal. However, the translation requesting terminal according to the present invention is not limited to the multi-function device 100, and may be a device such as a personal computer, a PDA (Personal Digital Assistant), and so on. Additionally, the network between the multi-function device 100 and the translation server 200 is not limited to the Internet 300, but may be a LAN, WAN, or other type of network. Part or all of these networks may include wireless areas. The original text and translation text are not limited to the English and Japanese languages, but may be in any language.

In the above embodiments, an aspect was described in which the confidential phrase replacement process is selected on a touch panel when the user instructs the multi-function device 100, which is the translation requesting terminal, to request a translation. However, it is also possible to automatically execute the confidential phrase replacement process according to the present embodiment simply by making an instruction to request an external translation service to perform a translation process. This makes it possible to prevent a situation in which the user, when requesting the translation of a document containing confidential information from an external translation service, accidentally forgets to specify the confidential phrase replacement process, thus causing confidential information to leak.

In the above embodiments, a configuration was described in which the user operates a touch panel on the multi-function device 100, which is the translation requesting terminal, to request an external translation service, but it is also possible to connect either with a cable or wirelessly a personal computer, a PDA, or a similar terminal to the multi-function device 100, send the original text data to be translated to the multi-function device 100 and then send the character string data of an original text A' to the external translation server 200 after the multi-function device 100 has performed the confidential phrase replacement process. In this case, the personal computer is configured to allow specification of whether the confidential phrase replacement process is needed or not, and the personal computer sends the original text data to the multi-function device 100 after attaching to it a flag indicating whether the confidential phrase replacement process is needed or not. The multi-function device 100 then performs the confidential phrase replacement process on the original text data if the confidential phrase replacement process flag is set to "needed," and then requests the translation service from the external translation server 200. Alternatively, the default state of the flag indicating whether the confidential phrase replacement process is needed or not can be set always to "needed," so that every time the multi-function device 100 receives a request for the translation process the confidential phrase replacement process is always performed. This makes it possible to protect the confidentiality of documents even if the user of the personal computer forgets to indicate whether the confidential phrase replacement process is needed or not.

In the above embodiments, a configuration was described in which the control portion 130 on the multi-function device 100 searches for all confidential phrases stored in the replacement rule base RI and replaces them with substitute phrases, but there is no limitation to this. It is also possible to replace only some of the confidential phrases in a document to be translated according to its level of importance. For example, three confidentiality levels, "low," "medium," and "high," could be set, and a variety of replacement rule bases could be stored ahead of time in the non-volatile memory portion 150$b$ in accordance with the confidentiality level, including only personal and company names for the "low" level, personal and company names and addresses for the "medium" level, personal and company names, addresses, and product (project) names for the "high" level, and so on. The user specifies one of the confidentiality levels using the touch panel in the operation inputting portion 160 and the multi-function device 100 performs the confidential phrase replacement process according to the specified level. Alternatively, items such as "personal and company name," "address," "product (project) name," "monetary amount," and so on could be stored separated into groups, and the group names made to be displayed on the detailed settings screen for the confidential phrase replacement process on the touch panel. The user selects these group names with "AND" or "OR" on the touch panel. The multi-function device 100 executes the confidential phrase replacement process only for the selected items. This type of configuration allows the confidential phrase replacement process to be performed in accordance with the confidentiality level, making it possible to perform only a simple confidential phrase replacement process for documents with a low confidentiality level. The processing volume thereby drops, improving processing efficiency.

It is also possible to provide a translation function to the multi-function device 100 itself, perform the translation process on text containing confidential phrases with the multi-function device 100, and request a translation from the external translation server 200 of only that text which does not contain confidential phrases. In this case, the multi-function device 100, after receiving the translation text from the translation server 200, combines that translation result with the translation result of the text with confidential phrases which the multi-function device 100 translated. By thus not requesting a translation from the external translation server 200 for those sections of an original text to be translated that have high confidentiality, protection of confidentiality is further improved.

As described above, the present invention provides, in one aspect, a translation requesting method for translating a document having: replacing an original phrase with a substitute phrase; translating the substitute phrase; and replacing a translation of the substitute phrase with a translation of the original phrase, wherein the substitute phrase is chosen to maintain semantic properties of the original phrase.

As described above, the present invention also provides, in one aspect, a translation system for translating a document having: a first replacing unit that replaces an original phrase with a substitute phrase; a translating unit that translates the substitute phrase; and a second replacing unit that replaces a translation of the substitute phrase with a translation of the original phrase, wherein the substitute phrase is chosen to maintain semantic properties of the original phrase.

According to an embodiment of the invention, the substitute phrase may be translated in a translation server.

As described above, the present invention also provides, in one aspect, a storage medium readable by a computer, the storage medium storing a program of instructions executable by the computer to perform a function for requesting the translation of a document, the instructions having: replacing an original phrase with a substitute phrase; translating the substitute phrase; and replacing a translation of the substitute phrase with a translation of the original phrase, wherein the substitute phrase is chosen to maintain semantic properties of the original phrase.

As described above, the present invention provides, in one aspect, a translation requesting method having: replacing, on the condition that a minimal semantic unit phrase having a predetermined property is contained in an original text, the minimal semantic unit phrase with a substitute phrase having the predetermined property; storing a translation of the minimal semantic unit phrase and a translation of the substitute phrase in association with each other in a storage device; sending the original text that has undergone the replacing process via a communications interface to a translation server having translation functionality; and replacing, on the condition that a translation text of the original text which is sent in the sending process is received from the translation server, the translation of the substitute phrase in the translation text with the translation of the minimal semantic unit phrase stored in the storage device.

As described above, the present invention also provides, in one aspect, a translation requesting terminal having: a communications interface for communicating with a translation server via a network; a replacement rule database storing in advance a minimal semantic unit phrase having a specific property and a substitute phrase having the specific property association with each other; a first replacing section for replacing the minimal semantic unit phrase in an original text with the substitute phrase stored in association with the minimal semantic unit phrase in the replacement rule database; a translation requesting section for sending the original text, which has been subjected to replacement by the first replacing section, to the translation server via the communications interface; a replacement table updating section for storing in a replacement table a translation of the minimal semantic unit phrase and a translation of the substitute phrase in association with each other; and a second replacing section for replacing, on the condition that a translation text of the original text sent by the translation requesting section is received from the translation server, the translation of the substitute phrase in the translation text with the translation of the minimal semantic unit phrase which is stored in the replacement table in association with the translation of the substitute phrase.

According to an embodiment of the invention, the replacement table updating section may delete from the replacement table the translation of the substitute phrase replaced by the second replacing section and the translation of the minimal semantic unit phrase stored in association with the translation of the substitute phrase.

According to another embodiment of the invention, the replacement rule base may store plural substitute phrases in association with the minimal semantic unit phrase, and the first replacing section may randomly select one of the plural substitute phrases and replace the minimal semantic unit phrase with the selected substitute phrase.

According to another embodiment of the invention, the replacement rule base may store plural minimal semantic unit phrases; and the translation requesting terminal may further comprise a minimal semantic unit phrase selecting section for letting a user select the specific property of minimal semantic unit phrases to be replaced by the first replacing section.

As described above, the present invention also provides, in one aspect, a storage medium readable by a computer, the storage medium storing a program of instructions executable by the computer to perform a function, the instructions comprising: replacing, on the condition that a minimal semantic unit phrase having a predetermined property is contained in an original text, the minimal semantic unit phrase with a substitute phrase having the predetermined property; storing a translation of the minimal semantic unit phrase and a translation of the substitute phrase in association with each other in a storing section; sending the original text that has undergone the replacing process via a communications interface to a translation server having translation functionality; and replacing, on the condition that a translation text of the original text which is sent in the sending process is received from the translation server, the translation of the substitute phrase in the translation text with the translation of the minimal semantic unit phrase stored in the storing section.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

The entire disclosure of Japanese Patent Application No. 2005-57458 filed on Mar. 2, 2005 including specification, claims, drawings and abstract is incorporated herein by reference in its entirety.

What is claimed is:

1. A translation system for translating a document comprising:
    a first replacing unit that replaces an original phrase having a predetermined attribute with a substitute phrase;
    a memory that stores a translation of the substitute phrase generated by the first replacing unit;
    a first translating unit that translates the original phrase;
    a transmitting unit that transmits a document including the original phrase substituted by the substitute phrase;
    a second translating unit that translates the document including the original phrase substituted by the substitute phrase;
    a receiving unit that receives from the second translating unit a document translated by the second translating unit;
    an extracting unit that extracts from the memory the translation of the substitute phrase in the document translated by the second translating unit; and
    a second replacing unit that replaces the translated substitute phrase with the translation of the original phrase generated by the first translating unit,
    wherein:
    the substitute phrase is chosen to maintain semantic properties of the original phrase; and
    the translation of the substitute phrase stored in the memory is visually different from the substitute phrase.

2. A non-transitory storage medium readable by a computer, the storage medium storing a program of instructions executable by the computer to perform a function for requesting translation of a document, the instructions comprising:
    replacing an original phrase having a predetermined attribute with a substitute phrase;
    storing a translation of the substitute phrase generated by the replacing step in a memory;
    translating the original phrase;
    transmitting a document including the original phrase substituted by a substitute phrase;
    translating the document including the original phrase substituted by the substitute phrase;
    receiving the translated document including the original phrase substituted by the substitute phrase;
    extracting from the memory the translation of the substitute phrase in the received translated document; and
    replacing the translated substitute phrase with a translation of the original phrase after the original phrase has been translated,
    wherein:
    the substitute phrase is chosen to maintain semantic properties of the original phrase; and
    the translation of the substitute phrase stored in the memory is visually different from the substitute phrase.

3. A translation requesting method comprising:
    replacing, on the condition that a minimal semantic unit phrase having a predetermined property is contained in an original text, the minimal semantic unit phrase with a substitute phrase having the predetermined property;
    storing a translation of the minimal semantic unit phrase and a translation of the substitute phrase in association with each other in a storage device;
    sending the original text that has undergone the replacing process via a communications interface to a translation server having translation functionality;
    extracting from the storage device the translation of the substitute phrase in the translated text; and
    replacing, on the condition that a translation text of the original text which is sent in the sending process is received from the translation server, the translation of the substitute phrase in the translation text with the translation of the minimal semantic unit phrase stored in the storage device generated by the sending step, wherein the translation of the substitute phrase stored in the storage device is visually different from the substitute phrase.

4. A translation requesting terminal comprising:
    a communications interface for communicating with a translation server via a network;
    a replacement rule database storing in advance a minimal semantic unit phrase having a specific property and a substitute phrase having the specific property in association with each other;
    a first replacing means for replacing the minimal semantic unit phrase in an original text with the substitute phrase stored in association with the minimal semantic unit phrase in the replacement rule database;
    a translation requesting means for sending the original text, which has been subjected to replacement by the first replacing means, to the translation server via the communications interface;
    a replacement table updating means for storing in a replacement table a translation of the minimal semantic unit phrase and a translation of the substitute phrase in association with each other;
    a searching means for searching for the translation of the substitute phrase in the translated text; and
    a second replacing means for replacing, on the condition that a translation text of the original text sent by the translation requesting means is received from the translation server, the translation of the substitute phrase in the translation text with the translation of the minimal semantic unit phrase which is stored in the replacement table in association with the translation of the substitute phrase, wherein the translation of the substitute phrase stored in the replacement table updating means is visually different from the substitute phrase.

5. The translation requesting terminal according to claim 4, wherein the replacement table updating means deletes from the replacement table the translation of the substitute phrase replaced by the second replacing means and the translation of the minimal semantic unit phrase stored in association with the translation of the substitute phrase.

6. The translation requesting terminal according to claim 4, wherein the replacement rule base stores a plurality of substitute phrases in association with the minimal semantic unit phrase, and the first replacing means randomly selects one of the plurality of substitute phrases and replaces the minimal semantic unit phrase with the selected substitute phrase.

7. The translation requesting terminal according to claim 4, wherein:
- the replacement rule base stores a plurality of minimal semantic unit phrases; and
- the translation requesting terminal further comprises a minimal semantic unit phrase selecting means for letting a user select the specific property of minimal semantic unit phrases to be replaced by the first replacing means.

8. A non-transitory storage medium readable by a computer, the storage medium storing a program of instructions executable by the computer to perform a function, the instructions comprising:
- replacing, on the condition that a minimal semantic unit phrase having a predetermined property is contained in an original text, the minimal semantic unit phrase with a substitute phrase having the predetermined property;
- storing a translation of the minimal semantic unit phrase and a translation of the substitute phrase in association with each other in a storing means;
- sending the original text that has undergone the replacing process via a communications interface to a translation server having translation functionality;
- searching for the translation of the substitute phrase in the translated text; and
- replacing, on the condition that a translation text of the original text which is sent in the sending process is received from the translation server, the translation of the substitute phrase in the translation text with the translation of the minimal semantic unit phrase stored in the storing means, wherein the translation of the substitute phrase stored in the storing means is visually different from the substitute phrase.

\* \* \* \* \*